United States Patent
Kozono (10) Patent No.: US 11,794,735 B2
(45) Date of Patent: Oct. 24, 2023

(54) VEHICLE DRIVE ASSISTANCE APPARATUS

(71) Applicant: SUBARU CORPORATION, Tokyo (JP)

(72) Inventor: Kazuya Kozono, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 267 days.

(21) Appl. No.: 17/212,628

(22) Filed: Mar. 25, 2021

(65) Prior Publication Data

US 2021/0323547 A1  Oct. 21, 2021

(30) Foreign Application Priority Data

Apr. 16, 2020 (JP) ................ 2020-073277

(51) Int. Cl.
*B60W 30/09* (2012.01)
*B60W 30/095* (2012.01)
(Continued)

(52) U.S. Cl.
CPC ........ *B60W 30/0956* (2013.01); *B60W 30/09* (2013.01); *B60W 30/18154* (2013.01); *B60W 40/04* (2013.01); *B60W 40/105* (2013.01); *G06V 20/584* (2022.01); *B60W 2554/802* (2020.02)

(58) Field of Classification Search
CPC ............. B60W 30/0956; B60W 30/09; B60W 30/18154; B60W 40/04; B60W 40/105; B60W 2554/802; B60W 2050/143; B60W 2556/50; B60W 10/18; B60W 30/095; B60W 50/14; G06V 20/584
See application file for complete search history.

(56) References Cited

U.S. PATENT DOCUMENTS

2011/0082623 A1* 4/2011 Lu .................. B60W 10/06
701/41
2015/0046038 A1  2/2015 Kawamata et al.
(Continued)

FOREIGN PATENT DOCUMENTS

JP        5773069 B2    9/2015

*Primary Examiner* — Jason Holloway
(74) *Attorney, Agent, or Firm* — McDermott Will & Emery LLP (57) ABSTRACT

A vehicle drive assistance apparatus includes a surrounding environment information acquiring unit, a crossing-vehicle recognition unit, a contact estimation unit, a contact avoidance operation determination unit, and a front-vehicle recognition unit. The crossing-vehicle recognition unit recognizes a crossing vehicle based on the surrounding environment information acquired by the surrounding environment information acquiring unit. The contact estimation unit estimates a possible contact between an own vehicle and the crossing vehicle at an intersection by comparing an intersection entering time of the own vehicle with an intersection entering time of the crossing vehicle. When a front vehicle entering the intersection prior to the own vehicle is recognized by the front-vehicle recognition unit, the contact avoidance operation determination unit calculates an intersection entering timing of the front vehicle, and determines that the contact avoidance operation is not to be executed if the estimated intersection entering timing is a predetermined value or less.

7 Claims, 5 Drawing Sheets

(51) Int. Cl.
  *B60W 30/18*   (2012.01)
  *B60W 40/105*  (2012.01)
  *B60W 40/04*   (2006.01)
  *G06V 20/58*   (2022.01)

(56) References Cited

U.S. PATENT DOCUMENTS

2016/0368492 A1* 12/2016 Al-Stouhi ............. B60W 50/14
2017/0113665 A1*  4/2017 Mudalige ............... G08G 1/166
2019/0291728 A1*  9/2019 Shalev-Shwartz ..........................
                                                     B60W 30/165

* cited by examiner

VEHICLE DRIVE ASSISTANCE APPARATUS

CROSS-REFERENCE TO RELATED APPLICATIONS

The present application claims priority from Japanese Patent Application No. 2020-073277 filed on Apr. 16, 2020, the entire contents of which are hereby incorporated by reference.

BACKGROUND

The technology relates to a vehicle drive assistance apparatus.

Various recent vehicles include a drive assistance apparatus. One of the control processes executed by the drive assistance apparatus is autonomous emergency braking (AEB) control that helps reduce damage from contact between vehicles. When the possibility of contact (including interference) is determined between an own vehicle and another vehicle or obstacle, the AEB control alerts the driver of the own vehicle to the possibility of contact and forcibly controls the braking operation of the own vehicle to avoid the contact.

The other vehicle includes a preceding vehicle traveling immediately in front of the own vehicle traveling on an own-vehicle traveling road, an oncoming vehicle trying to change a course from an oncoming lane to a direction crossing an advancing direction of the own vehicle, and a crossing vehicle traveling toward the own vehicle traveling road on a crossing road that crosses the own vehicle traveling road at an intersection. When determining the possibility of contact between the own vehicle and the crossing vehicle at the intersection, the drive assistance apparatus executes the AEB control.

However, executing the AEB control whenever the drive assistance apparatus determines the possibility of contact between the own vehicle and the crossing vehicle at an intersection can make the driver of the own vehicle feel troublesome.

For example, in a case where a crossing vehicle coming closer to the own vehicle is detected while a preceding vehicle traveling in front of the own vehicle is passing through the intersection, the driver of the crossing vehicle recognizes the preceding vehicle prior to the own vehicle. Thus, the own vehicle is unlikely to contact the crossing vehicle at the intersection. For example, Japanese Patent No. 5773069 discloses a technique to deactivate the AEB control when the preceding vehicles is detected in front of the own vehicle to help make the driver of the own vehicle feel less troublesome.

SUMMARY

An aspect of the technology provides a vehicle drive assistance apparatus including a surrounding environment information acquiring unit, a crossing-vehicle recognition unit, a contact estimation unit, a contact avoidance operation determination unit, and a front-vehicle recognition unit. The surrounding environment information acquiring unit is configured to acquire information on a surrounding environment in front of an own vehicle traveling on an own-vehicle traveling road. The crossing-vehicle recognition unit is configured to recognize a crossing vehicle traveling on a crossing road on the basis of the information on the surrounding environment acquired by the surrounding environment information acquiring unit. The crossing road crosses the own-vehicle traveling road at an intersection located in front of the own vehicle. The contact estimation unit is configured to estimate a possible contact between the own vehicle and the crossing vehicle by comparing an estimated time when the own vehicle enters the intersection with an estimated time when the crossing vehicle enters the intersection. The contact avoidance operation determination unit is configured to determine whether to execute a contact avoidance operation of the own vehicle in a case where the possible contact between the own vehicle and the crossing vehicle is estimated by the contact estimation unit. The front-vehicle recognition unit is configured to recognize a front vehicle traveling in front of the own vehicle in the own-vehicle traveling road and entering the intersection on the basis of the information on the surrounding environment acquired by the surrounding environment information acquiring unit. In a case where the front-vehicle recognition unit recognizes the front vehicle entering the intersection prior to the own vehicle, the contact avoidance operation determination unit is configured to calculate an estimated timing when the front vehicle enters the intersection. In a case where the estimated timing is less than or equal to a predetermined value, the contact avoidance operation determination unit is configured to determine that the contact avoidance operation is not to be executed.

An aspect of the technology provides a vehicle drive assistance apparatus including circuitry. The circuitry is configured to acquire information on a surrounding environment in front of an own vehicle traveling on an own-vehicle traveling road. The circuitry is configured to recognize a crossing vehicle traveling on a crossing road crossing the own-vehicle traveling road at an intersection located in front of the own vehicle on the basis of the information on the surrounding environment acquired by the surrounding environment information acquiring unit. The circuitry is configured to estimate a possible contact between the own vehicle and the crossing vehicle by comparing an estimated time when the own vehicle enters the intersection with an estimated time when the crossing vehicle enters the intersection. The circuitry is configured to determine whether to execute a contact avoidance operation of the own vehicle in a case where the possible contact between the own vehicle and the crossing vehicle is estimated.

The circuitry is configured to recognize a front vehicle traveling in front of the own vehicle in the own-vehicle traveling road and entering the intersection on the basis of the information on the surrounding environment acquired by the surrounding environment information acquiring unit. The circuitry is configured to calculate an estimated timing when the front vehicle enters the intersection in a case where the front vehicle entering the intersection prior to the own vehicle is recognized. The circuitry is configured to determine that the contact avoidance operation is not to be executed in a case where the estimated timing is less than or equal to a predetermined value.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

In the technique disclosed in Japanese Patent No. 5773069, the AEB control is deactivated whenever a preceding vehicle is detected in front of an own vehicle regardless of the presence or absence of a crossing vehicle.

However, there are some cases where it is difficult to determine the possibility of contact between the own vehicle and the crossing vehicle even when the own vehicle is traveling following the preceding vehicle. For example, in a case where the crossing vehicle is trying to enter an intersection from the crossing road while the own vehicle is traveling following the preceding vehicle on a priority road and where an inter-vehicular distance between the preceding vehicle and the own vehicle is relatively large, the crossing vehicle can cut in between the own vehicle and the preceding vehicle.

If the AEB control is deactivated in such a circumstance, it is difficult to sufficiently alert the driver of the own vehicle to the possible contact with the crossing vehicle, which can make it difficult to efficiently avoid contact between the own vehicle and the crossing vehicle at the intersection.

It is desirable to provide a vehicle drive assistance apparatus that efficiently avoids contact between the own vehicle and another vehicle at an intersection and helps make the driver of the own vehicle feel less troublesome by reducing unnecessary contact avoidance operation.

Figure 1:
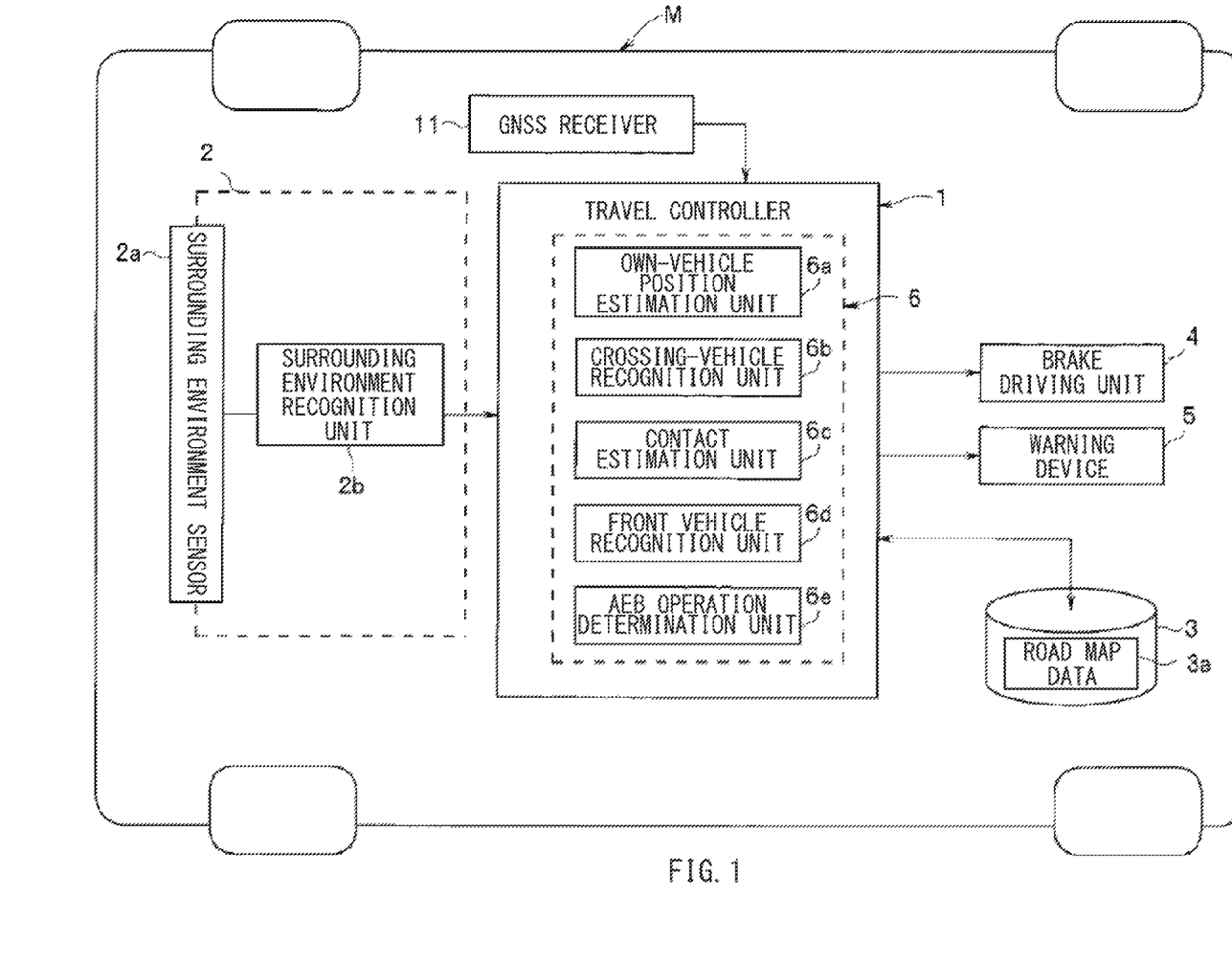
FIG. 1 is a schematic diagram of an overall configuration of a drive assistance apparatus according to one example embodiment of the technology.

The following description describes some example embodiments of the technology with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description. With reference to FIG. 1, a drive assistance apparatus mounted on an own vehicle M may include a travel controller 1, a surrounding environment recognition unit 2, a road map database 3, a brake driving unit 4, and a warning device 5. In one embodiment, the surrounding environment recognition unit 2 may serve as a "surrounding environment information acquiring unit".

In addition to known adaptive cruise control (ACC) and active lane keep (ALK) control, the travel controller 1 may execute autonomous emergency braking (AEB) control. When determining the possibility of contact (including interference) between the own vehicle M and another vehicle or obstacle, the AEB control may cause the warning device 5 to notify the driver of the own vehicle M of the possibility of contact, and, if necessary, forcibly operate the brake driving unit 4 to avoid the contact. Because the ACC and the ALK control are executed by the travel controller 1 in a typical manner, the description thereof is omitted herein. Although a preceding vehicle P, an oncoming vehicle O, a crossing vehicle I, and another vehicle may also be subjected to the AEB control, the description of the AEB control on the preceding vehicle P and the oncoming vehicle O is omitted herein because the AEB control on the preceding vehicle P and the oncoming vehicle O is executed in a typical manner. In one embodiment, the preceding vehicle P and the oncoming vehicle O may each serve as a "vehicle in front of the own vehicle".

The following description thus focuses on the AEB control on the crossing vehicle I executed by the travel controller 1. Note that the crossing vehicle I may refer to a vehicle traveling toward the own-vehicle traveling road on a crossing road that crosses, at an intersection, an own-vehicle traveling road on which the own vehicle M is traveling.

The surrounding environment recognition unit 2 may include a surrounding environment sensor 2a and a surrounding environment recognition unit 2b. The surrounding environment sensor 2a may sense a surrounding environment around the own vehicle M to acquire surrounding environment information. The surrounding environment sensor 2a may be disposed on a front portion, a front corner, or an internal face of a front windshield of the own vehicle M, for example. Alternatively, a plurality of surrounding environment sensors 2a may be disposed. The surrounding environment sensor 2a may include one of an ultrasonic radar, a millimeter-wave radar, a light detection and ranging (LiDAR), a stereo camera including a main camera and a sub-camera, and a monocular camera. Alternatively, the surrounding environment sensor 2a may be configured by a combination of two or more thereof.

On the basis of the surrounding environment information acquired by the surrounding environment sensor 2a, the surrounding environment recognition unit 2b may recognize a surrounding vehicle, such as an automobile, a motorcycle, or a bicycle traveling around the own vehicle M, road signs, and road markings by a known method such as pattern matching, for example. Thereafter, the surrounding environment recognition unit 2b may output the vehicle information recognized by the surrounding environment recognition unit 2b to the travel controller 1.

The road map database 3 may be a mass storage medium such as a HDD, and store road map data 3a. The road map data 3a may include static data, such as data on lanes, roads, and buildings on the roads. The data on lanes may include data on the number of the lanes, the width of the lanes, the coordinate indicative of a middle position of each lane, the traveling azimuth angle of each lane, and a speed limit, for example. The data on roads may include data on intersections, priority roads, and non-priority roads, for example. The data on buildings on the roads may include data on traffic lights and road signs, for example.

The travel controller 1 may have an input coupled to the surrounding environment recognition unit 2b, the road map database 3, and a global navigation satellite system (GNSS) 11 that receives positioning signals transmitted from a plurality of positioning satellites, for example.

The travel controller 1 and the surrounding environment recognition unit 2b may each include a known microcomputer that includes a CPU, a RAM, and a ROM, and peripheral devices. The ROM may preliminarily store fixed data such as programs to be executed by the CPU and base maps.

The travel controller 1 may have an output coupled to the brake driving unit 4 and the warning device 5. The brake driving unit 4 may forcibly cause a braking operation by supplying a hydraulic brake fluid to a wheel cylinder of a brake caliper provided in each drive wheel. The warning device 5 may give warning to the driver of the own vehicle M. The warning device 5 may give auditory warning using an audio speaker or visual warning using a display.

The travel controller 1 may further include a crossing-vehicle contact avoidance calculator 6 that executes the AEB control when the crossing vehicle I is detected. The crossing-vehicle contact avoidance calculator 6 may include an own-vehicle position estimation unit 6a, a crossing-vehicle recognition unit 6b, a contact estimation unit 6c, a front-vehicle recognition unit 6d, an AEB operation determination unit 6e. In one embodiment, the AEB operation determination unit 6e may serve as a "contact avoidance operation determination unit".

The own-vehicle position estimation unit 6a may acquire data on traveling position (latitude, longitude, and altitude) of the own vehicle M on the basis of the positioning signals received at the GNSS receiver 11, perform map matching of the traveling position of the own vehicle M on the road map of the road map data 3a to estimate a current position (own-vehicle position) of the own vehicle M. Further, on the basis of the data on the own-vehicle position or the surrounding environment information recognized by the surrounding environment recognition unit 2b of the surrounding environment recognition unit 2, the own-vehicle position estimation unit 6a may acquire information on an intersection located in front of the own vehicle M traveling on the own-vehicle traveling road with reference to the road map data 3a. Thereafter, on the basis of the information on the intersection, the own-vehicle position estimation unit 6a may calculate an estimated time until the own vehicle M arrives at the intersection (hereinafter referred to as an intersection arrival time TLM). The own-vehicle position estimation unit 6a may then add a current time Tn to the intersection arrival time TLM to calculate an estimated time when the own vehicle M enters the intersection (hereinafter referred to as an intersection entering time TM).

On the basis of the vehicle information acquired by the surrounding environment recognition unit 2b of the surrounding environment recognition unit 2 or via road-to-vehicle communication, the crossing-vehicle recognition unit 6b may determine whether the crossing vehicle I is detected that is traveling toward the intersection on the crossing road that crosses the own-vehicle traveling road at the intersection.

If the crossing-vehicle recognition unit 6b detects the crossing vehicle I traveling toward the intersection of the own-vehicle traveling road, the contact estimation unit 6c may calculate an estimated time when the crossing vehicle I enters the intersection (hereinafter referred to as an intersection entering time TI). The contact estimation unit 6c may then compare the intersection entering time TI of the crossing vehicle I with the intersection entering time TM of the own vehicle M to determine whether there is the possibility of contact between the own vehicle M and the crossing vehicle I at the intersection.

If the contact estimation unit 6c determines that there is the possibility of contact between the own vehicle M and the crossing vehicle I at the intersection, the front-vehicle recognition unit 6d may determine whether the preceding vehicle P traveling immediately in front of the own vehicle M and the oncoming vehicle O traveling on the oncoming lane toward the intersection have been detected on the basis of the vehicle information acquired by the surrounding environment recognition unit 2b.

If the contact estimation unit 6c determines that there is the possibility of contact between the own vehicle M and the crossing vehicle I at the intersection, the AEB operation determination unit 6e may cause the warning device 5 to notify the driver of the own vehicle M of the possibility of contact before the own vehicle M enters the intersection to urge the driver of the own vehicle M to decelerate the own vehicle M. If the possibility of contact between the own vehicle M and the crossing vehicle I at the intersection is high, the AEB operation determination unit 6e may cause the brake driving unit 4 to forcibly decelerate and stop the own vehicle M to avoid the contact between the own vehicle M and the crossing vehicle I.

Even in a case where the preceding vehicle P or the oncoming vehicle O have been detected by the front-vehicle recognition unit 6d, the AEB operation determination unit 6e may deactivate the brake driving unit 4 if the preceding vehicle P or the oncoming vehicle O satisfies a predetermined condition for cancelling the intervention of the control. As a result, the own vehicle M may pass through the intersection without being forcibly decelerated.

Figure 2:
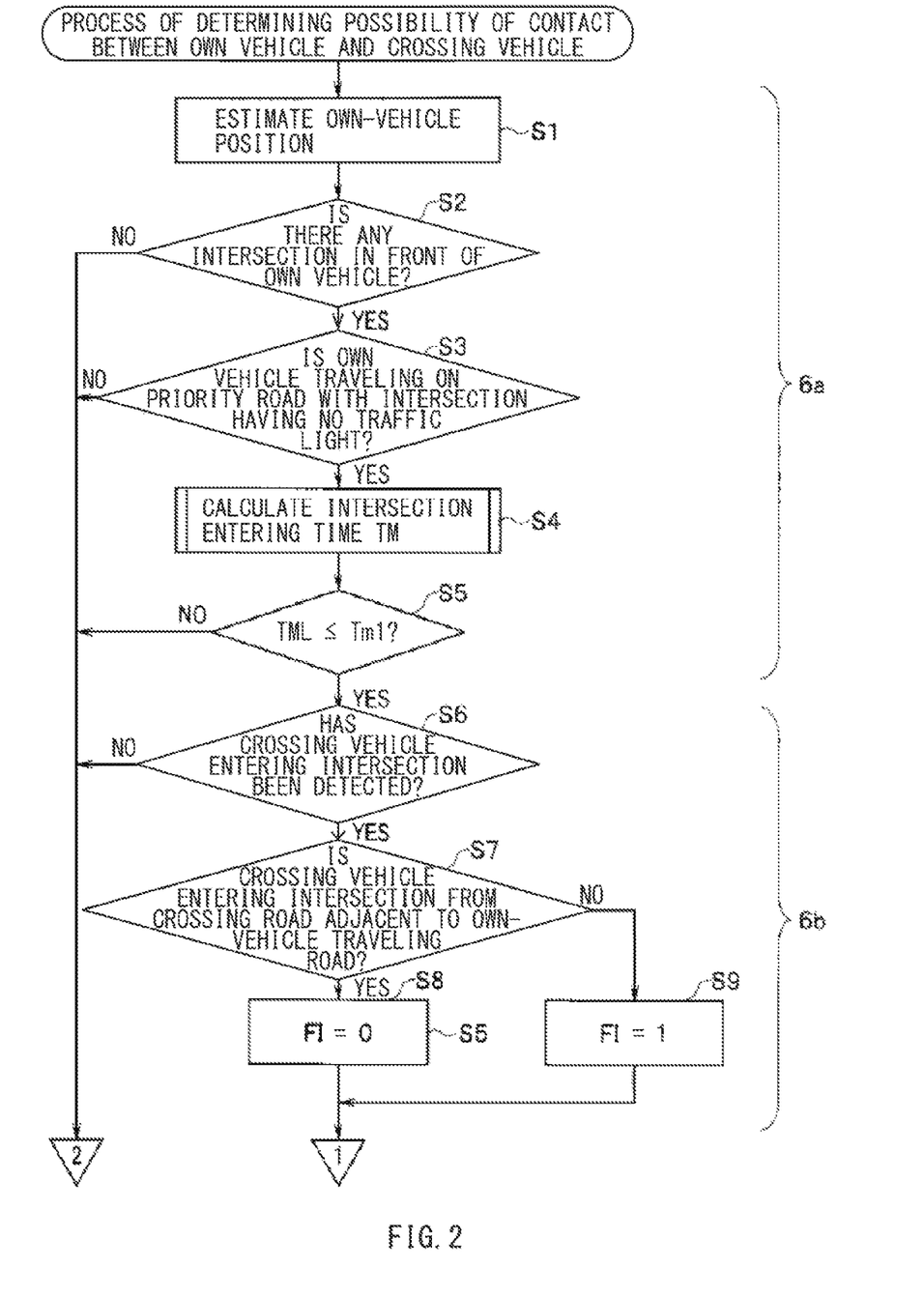
FIG. 2 is a flowchart illustrating an exemplary routine of a process of determining the possibility of contact between an own vehicle and a crossing vehicle.
Figure 3:
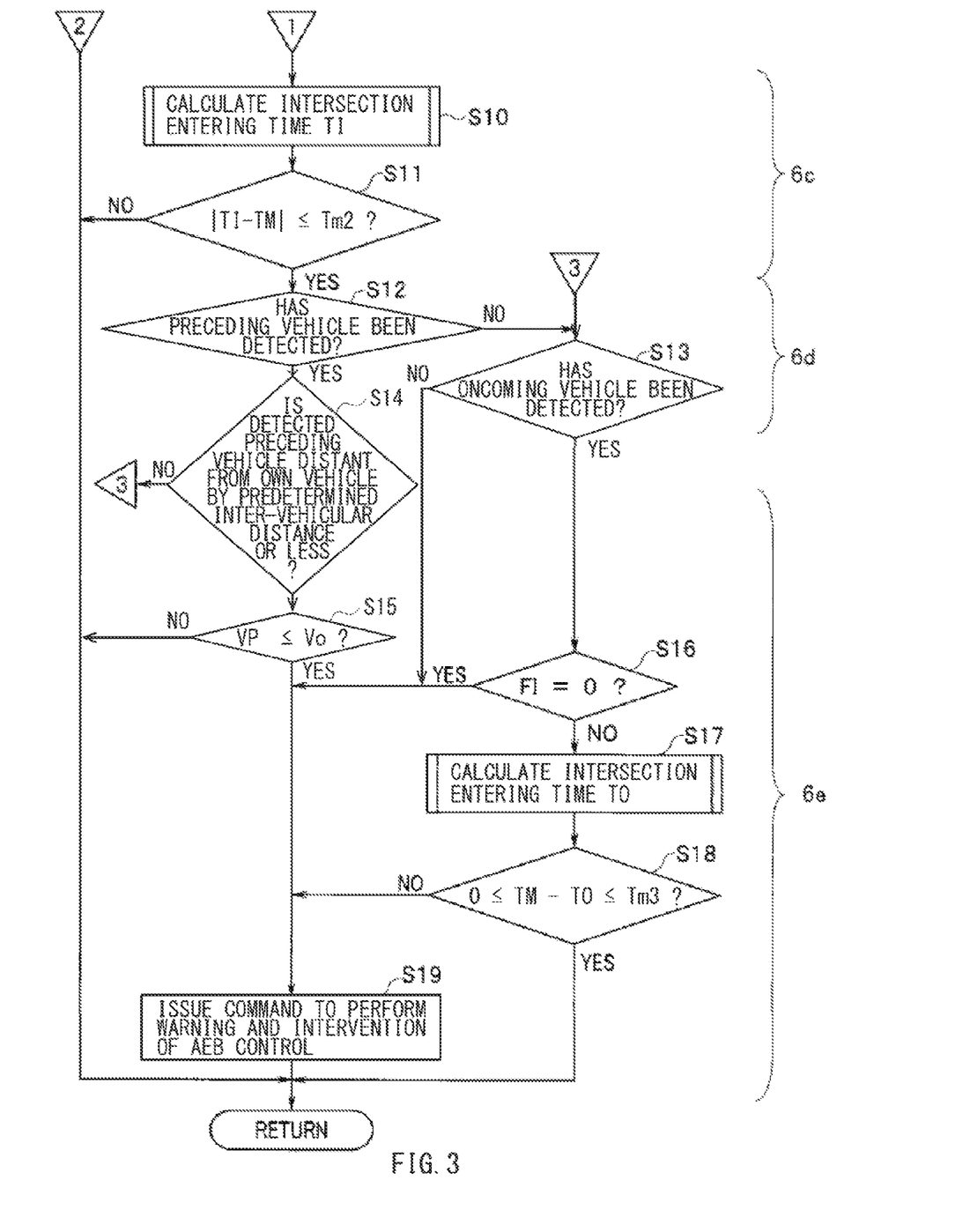
FIG. 3 is a flowchart illustrating an exemplary routine subsequent to the routine of FIG. 3 of the process of determining the possibility of contact between the own vehicle and the crossing vehicle.

The above-mentioned process of determining the possibility of contact between the own vehicle M and the crossing vehicle I executed by the crossing-vehicle contact avoidance calculator 6 may be performed in accordance with an exemplary routine illustrated in FIGS. 2 and 3, for example. For convenience of description, a left-hand road is exemplified in the following description. The following description may also be applied to a right-hand road by replacing the term "left" with "right".

In one embodiment, processes in Steps S1 to S5 may be performed by the own-vehicle position estimation unit 6a. In one embodiment, processes in Steps S6 to S9 may be performed by the crossing-vehicle recognition unit 6b. In one embodiment, processes in Steps S10 and S11 may be performed by the contact estimation unit 6c. In one embodiment, processes in Steps S12 and S13 may be performed by the front-vehicle recognition unit 6d. In one embodiment, processes in Steps S14 to S19 may be performed by the AEB operation determination unit 6e.

This routine may start with Step S1 that acquires time-series position data on a current traveling position (own-vehicle position, e.g., latitude, longitude, and altitude) of the own vehicle M on the basis of the positioning signals received at the GNSS receiver 11. Thereafter, the position data acquired may be mapped on the road map of the road map data 3a to estimate a current position (own-vehicle position) of the own vehicle M that changes over time and to specify an own-vehicle traveling road on which the own vehicle M is traveling and an advancing direction of the own vehicle M.

Thereafter, in Step S2, it may be determined on the basis of the road map data whether there is any intersection in a region from the current position of the own vehicle M traveling on the own-vehicle traveling road to a predetermined position in front of the own vehicle M (e.g., several hundred meters). If an intersection is detected (Step S2:

YES), the procedure may proceed to Step S3. In contrast, if no intersection is detected (Step S2: NO), the procedure may exit the routine.

Thereafter, in Step S3, it may be determined whether the own-vehicle traveling road that crosses the crossing road at the intersection is a priority road with an intersection having no traffic light. The determination as to whether the own-vehicle traveling road is a priority road with an intersection having no traffic light may be made on the basis of the data on intersections included in the road map data or the surrounding environment information recognized by the surrounding environment recognition unit 2*b* of the surrounding environment recognition unit 2.

If it is determined that the own-vehicle traveling road is a priority road with an intersection having no traffic light (Step S3: YES), the procedure may proceed to Step S4. In contrast, if it is determined that the own-vehicle traveling road is a non-priority road, i.e., if it is determined that the crossing road is a priority road or that the intersection is provided with a traffic light (Step S3: NO), the procedure may exit the routine. If the intersection is provided with a traffic light, it may be estimated that the own vehicle M is unlikely to contact with the crossing vehicle I at the intersection because the crossing vehicle I follows an indication (e.g., green signal or red signal) of the traffic light.

In Step S4, the intersection entering time TM of the own vehicle M may be determined. Herein, the term "intersection" may refer to a region at which two or more roads intersect with each other. For a crossroad illustrated in FIGS. 4 and 5, a region defined by the widths of the two roads may correspond to the intersection.

The intersection entering time TM may be calculated by various known methods. For example, a distance LM from the own-vehicle position to the intersection may be divided by an own vehicle speed VM to calculate the intersection arrival time TLM until the own vehicle M arrives at the intersection (i.e., TLM=LM/VM). Then, the current time Tn may be added to the intersection arrival time TLM to calculate the intersection entering time TM (i.e., TM=TLM+Tn).

Note that the own vehicle speed VM may be detected by a non-illustrated speed sensor provided in the own vehicle M. The distance LM may be determined by measuring a distance from the own-vehicle position of the own vehicle M mapped on the road map to the intersection set on the road map. Alternatively, in a case where the intersection is recognized on the basis of the surrounding environment information acquired by the surrounding environment recognition unit 2*b* of the surrounding environment recognition unit 2, the distance LM may be determined on the basis of the surrounding environment information.

Thereafter, in Step S5, the intersection arrival time TLM may be compared with a first determination time Tm1. The first determination time Tm1 may be a threshold to determine a time when the warning and the intervention of the AEB control is executed before the intersection. For example, the first determination time Tm1 may be five to eight seconds. If the intersection arrival time TLM is less than or equal to the first determination time Tm1 (i.e., TLM Tm1) (Step S5: YES), the procedure may proceed to Step S6. In contrast, the intersection arrival time TLM is greater than the first determination time (i.e., TLM>Tm1), the procedure may exit the routine.

In Step S6, it may be determined whether the crossing vehicle I entering the intersection has been detected on the basis of the surrounding environment information acquired by the surrounding environment recognition unit 2*b* of the surrounding environment recognition unit 2. In a case where the crossing road is visually recognizable from the own-vehicle traveling road near the intersection, it is naturally possible for the surrounding environment sensor 2*a* mounted on the own vehicle M to recognize the crossing road. In another case where a crosswalk is provided on way to the intersection, the surrounding environment sensor 2*a* mounted on the own vehicle M may recognize the crossing road through the crosswalk. Alternatively, the crossing vehicle I entering the intersection may be recognized via road-to-vehicle communication.

If the crossing vehicle I has been recognized (Step S6: YES), the procedure may proceed to Step S7. In contrast, if no crossing vehicle I has been recognized (Step S6: NO), the procedure may exit the routine. In Step S7, it may be determined from which crossing road the crossing vehicle I is traveling toward the intersection on the basis of a temporal change in position data (moving direction) of the crossing vehicle I.

If it is determined that the crossing vehicle I is entering the intersection from a crossing road adjacent to the own-vehicle traveling road (i.e., a left crossing road) (Step S7: YES), the procedure may proceed to Step S8 in which a crossing vehicle enter flag FI is cleared (i.e., the crossing vehicle enter flag FI is set at 0), and the procedure may proceed to Step S10. In contrast, if it is determined that the crossing vehicle I is entering the intersection from a crossing road adjacent to the oncoming lane (i.e., aright crossing road) (Step S7: NO), the procedure may branch to Step S9 in which the crossing vehicle enter flag FI is set (i.e., the crossing vehicle enter flag FI is set to 1), and the procedure may proceed to Step S10.

Figure 4:
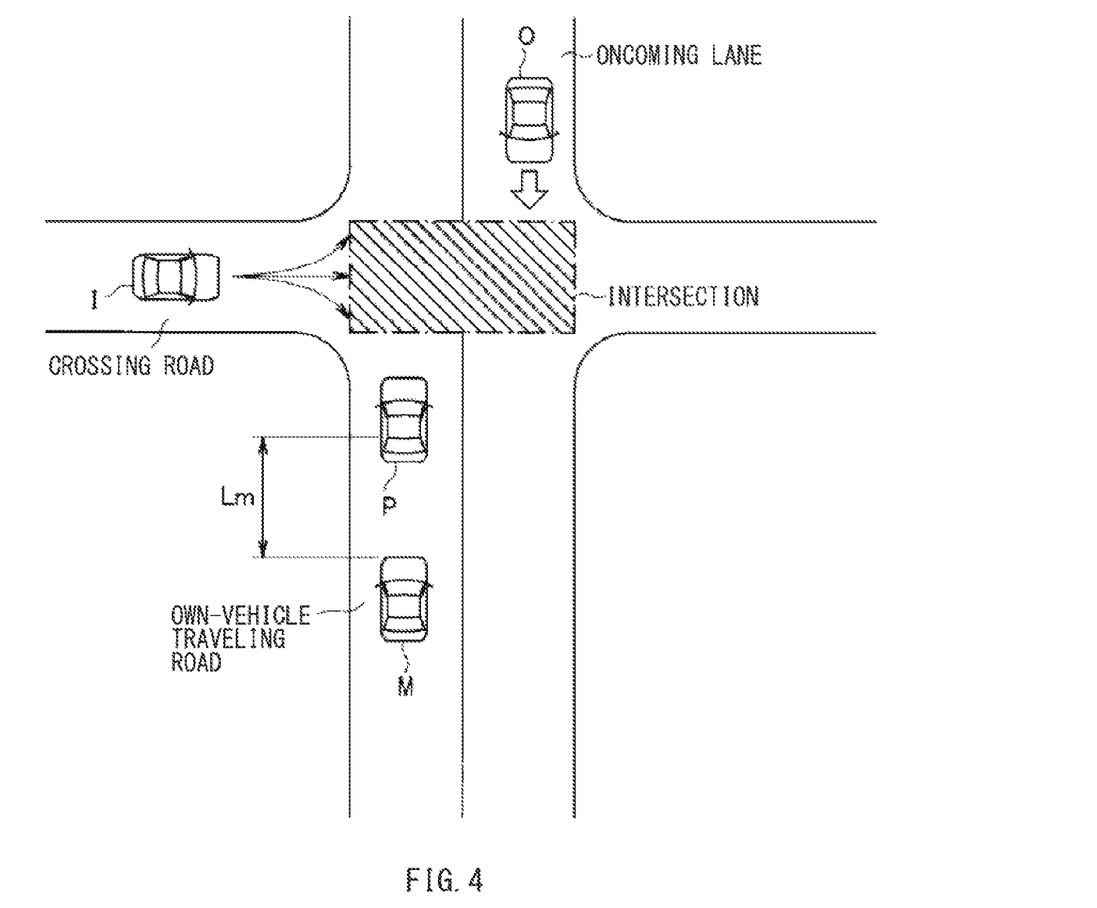
FIG. 4 is an explanatory diagram illustrating control executed by the own vehicle when the crossing vehicle is entering an intersection from a left non-priority road.
Figure 5:
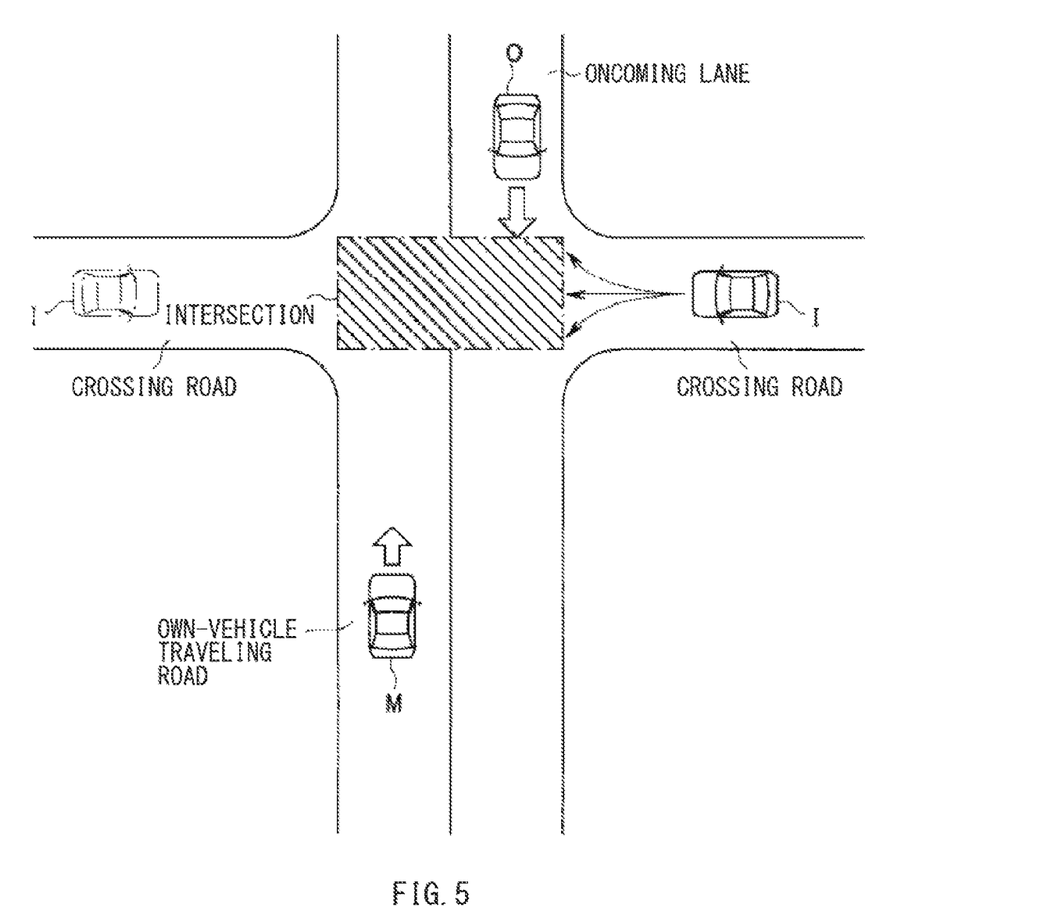
FIG. 5 is an explanatory diagram illustrating control executed by the own vehicle when the crossing vehicle is entering the intersection from a right non-priority road.

For the crossroad provided with an intersection as illustrated in FIGS. 4 and 5, the crossing vehicle I may travel straight, turn to the right, or turn to the left after entering the intersection. In a case where the crossing vehicle I is trying to enter the intersection from the left crossing road as illustrated in FIG. 4, there is the possibility of contact between the own vehicle M and the crossing vehicle I at the intersection wherever the crossing vehicle I advances. In contrast, in a case where the crossing vehicle I is trying to enter the intersection from the right crossing road and turn to the left as illustrated in FIG. 5, there is no possibility of contact between the own vehicle M and the crossing vehicle I at the intersection. Therefore, if it is estimated that the crossing vehicle I turns to the left before the own vehicle M enters into the intersection, the procedure may exit the routine after Step S9.

In Step S10, the intersection entering time TI of the crossing vehicle I may be calculated. Note that the crossing vehicle I detected at this time may be either one of the crossing vehicle I traveling on the left crossing road adjacent to the own-vehicle traveling road (see FIG. 4) or the crossing vehicle I traveling on the right crossing road adjacent to the oncoming lane (see FIG. 5).

The intersection entering time TI may be calculated in a similar manner as the intersection entering time TM of the own vehicle M described above. First, a distance LI from a current position of the crossing vehicle I to the intersection may be divided by a vehicle speed VI of the crossing vehicle I to calculate the intersection arrival time TLI (i.e., TLI=LI/VI). Then, the current time Tn may be added to the intersection arrival time TLI to calculate the intersection entering time TI (i.e., TI=TLI+Tn).

Note that the distance LI may be determined by measuring a distance from the current position of the crossing vehicle I specified on the road map through map matching to the intersection set on the road map. The vehicle speed VI of the crossing vehicle I may be determined from the amount of movement of the crossing vehicle I detected in a time-series.

Thereafter, in Step S11, an absolute value of the difference between the intersection entering time TM of the own vehicle M and the intersection entering time TI of the crossing vehicle I (|TI−TM|) may be compared with a contact determination time Tm2. The contact determination time Tm2 may be a time width in which the own vehicle M and the crossing vehicle I possibly contact with each other at the intersection. The contact determination time Tm2 may be three to eight seconds, for example, which may be determined by a preliminary experiment.

If the absolute value of the difference |TI−TM| is less than or equal to the contact determination time Tm2 (i.e., |TI−TM|≤Tm2) (Step S11: YES), it may be determined that there is the possibility of contact between the own vehicle M and the crossing vehicle I at the intersection, and the procedure may proceed to Step S12. If the absolute value of the difference |TI−TM| is greater than the contact determination time Tm2 (i.e., |TI−TM|≥Tm2) (Step S11: NO), it may be determined that the own vehicle M will pass through the intersection without contacting the crossing vehicle I, and the procedure may exit the routine.

As illustrated in FIG. 4, the contact between the own vehicle M and the crossing vehicle I at the intersection may occur not only when the own vehicle M and the crossing vehicle I arrive at the intersection at the same time but also when either one of the own vehicle M and the crossing vehicle I runs into the intersection earlier than the other.

Thereafter, in Step S12, it may be determined whether the preceding vehicle P has been recognized immediately in front of the own vehicle M. If the preceding vehicle P has not been recognized or detected (Step S12: NO), the procedure may branch to Step S13. In contrast, if the preceding vehicle P has been recognized (Step S12: YES), the procedure may proceed to Step S14. In Step S14, it may be determined whether the preceding vehicle P recognized is distant from the own vehicle M by a predetermined inter-vehicular distance Lm or less (see FIG. 4).

The inter-vehicular distance Lm may refer to a distance to be maintained between the own vehicle M and the preceding vehicle P to cause the crossing vehicle I having recognized the preceding vehicle P to wait for the preceding vehicle P to pass through the intersection and the own vehicle M to pass through the intersection following the preceding vehicle P. The inter-vehicular distance Lm may be about 15 to 45 meters, for example. The presence or absence of the preceding vehicle P and the inter-vehicular distance Lm between the own vehicle M and the preceding vehicle P may be determined on the basis of the surrounding environment information acquired by the surrounding environment recognition unit 2b of the surrounding environment recognition unit 2. In one embodiment, the inter-vehicular distance Lm between the own vehicle M and the preceding vehicle P may serve as an "estimated timing when a front vehicle enters the intersection".

If the preceding vehicle P is detected distant from the own vehicle M by the inter-vehicular distance Lm or less (Step S14: YES), the procedure may proceed to Step S15. In contrast, if the preceding vehicle P is detected distant from the own vehicle M by a distance greater than the inter-vehicular distance Lm, the procedure may return to Step S13, as in the case where the preceding vehicle P is not recognized.

In Step S15, the vehicle speed of the preceding vehicle P (hereinafter referred to as a preceding vehicle speed VP) may be compared with a low-speed determination vehicle speed Vo. In a case where the preceding vehicle P is traveling at a low speed, the crossing vehicle I can cut in between the own vehicle M and the preceding vehicle P. To deal with such a circumstance, if the preceding vehicle speed VP is less than or equal to the low-speed determination vehicle speed Vo (i.e., VP Vo) (Step S15: YES), the intervention of the AEB control may not be cancelled even if the preceding vehicle P has been detected, and the procedure may jump to Step S19. In contrast, if the preceding vehicle speed VP is greater than the low-speed determination vehicle speed Vo (i.e., VP≥Vo) (Step S15: NO), it may be determined that the intervention of the AEB control is not required because it is estimated that the crossing vehicle I will wait for the own vehicle M to pass through the intersection, and the procedure may exit the routine. As a result, the contact avoidance operation may be cancelled.

When the procedure proceeds from Step S12 or Step S14 to Step S13, it may be determined whether the oncoming vehicle O approaching the intersection is present on the oncoming lane. The oncoming vehicle O approaching the intersection may be determined on the basis of the vehicle information acquired by the surrounding environment recognition unit 2b of the surrounding environment recognition unit 2. Alternatively, the oncoming vehicle O approaching the intersection may be detected via road-to-vehicle communication with a roadside device disposed near the intersection.

If the oncoming vehicle O has been detected (Step S13: YES), the procedure may proceed to Step S16. In contrast, if the oncoming vehicle O has not been detected (Step S13: NO), the procedure may jump to Step S19. In Step S16, it may be determined from which crossing road the crossing vehicle I is entering the intersection with reference to the crossing vehicle enter flag FI. If the crossing vehicle I is entering the intersection from the crossing road adjacent to the own-vehicle traveling road (i.e., FI=0) (Step S16: YES), the procedure may proceed to Step S19. In such a case where the detected oncoming vehicle O is entering the intersection from the crossing road adjacent to the own-vehicle traveling road as indicated by a chain line in FIG. 5, there is the possibility of contact between the own vehicle M and the crossing vehicle I at the intersection. Therefore, the intervention of the AEB control may not be cancelled, and the procedure may jump to Step S19.

In contrast, if the crossing vehicle I is entering the intersection from the crossing road adjacent to the oncoming lane (i.e., FI=1) (Step S16: NO), the procedure may proceed to Step S17. In Step S17, an intersection entering time TO of the oncoming vehicle O may be calculated. First, an intersection arrival time TLO may be calculated by dividing a distance LO from the current position of the oncoming vehicle O to the intersection by a vehicle speed of the oncoming vehicle O (hereinafter referred to as an oncoming vehicle speed VO) (i.e., TLO=LO/VO). Then, the current time Tn may be added to the intersection arrival time TLO to calculate the intersection entering time TO (i.e., TO=TLO+Tn).

In a case where the oncoming vehicle O has been detected on the basis of the vehicle information acquired by the surrounding environment recognition unit 2b of the surrounding environment recognition unit 2, the oncoming vehicle speed VO may be calculated from a relative speed between the own vehicle M and the oncoming vehicle O. The distance LO to the intersection may be determined by measuring a distance from the current position of the oncoming vehicle O specified on the road map through map matching to the intersection set on the road map. Alternatively, the distance LO to the intersection and the oncoming vehicle speed VO may be acquired via road-to-vehicle communication.

Thereafter, in Step S18, the difference between intersection entering time TM of the own vehicle M and the intersection entering time TO of the oncoming vehicle O (i.e., TM−TO) may be compared with a crossing-vehicle waiting time Tm3. In one embodiment, the difference (TM−TO) may serve as the "estimated timing when a front vehicle enters the intersection". In a case where the difference is 0 (zero) (i.e., TM−TO=0), it may be estimated that the own vehicle M and the oncoming vehicle O will enter the intersection at the same time.

As illustrated in FIG. 5, the driver of the crossing vehicle I trying to enter the intersection from the crossing road adjacent to the oncoming lane may first recognize the oncoming vehicle O approaching the intersection, and estimate an arrival time (or timing) when the oncoming vehicle O arrives at the intersection by sight. The driver of the crossing vehicle I may then determine whether to enter the intersection before the oncoming vehicle O arrives at the intersection or to wait for the oncoming vehicle O to pass through the intersection before entering the intersection. Accordingly, in a case where the oncoming vehicle O enters the intersection prior to the own vehicle M, and where the own vehicle M enters the intersection in a predetermined time after the oncoming vehicle O enters the intersection, the crossing vehicle I is unlikely to contact the own vehicle M at the intersection because the crossing vehicle I waits for the own vehicle M to pass through the intersection. Thus, the crossing-vehicle waiting time Tm3 may be set at an allowable time that prevents the crossing vehicle I from running into the intersection when the own vehicle M is entering the intersection later than the oncoming vehicle O. The crossing-vehicle waiting time Tm3 may be determined by a preliminary experiment.

If it is estimated that the oncoming vehicle O will enter the intersection at the same time as the own vehicle M or that the oncoming vehicle O will enter the intersection before the elapse of the crossing-vehicle waiting time Tm3 (i.e., 0≤TM−TO≤Tm3) (Step S18: YES), it may be determined that the warning and the intervention of the AEB control is not required because it is estimated that there is no possibility of contact between the own vehicle M and the crossing vehicle I, and the procedure may exit the routine. That is, in such a situation, it may be estimated that the crossing vehicle I will wait for the oncoming vehicle O and the own vehicle M to pass through the intersection, or that at least there is no possibility of contact between the own vehicle M and the crossing vehicle I. As a result, the contact avoidance operation may be cancelled.

In contrast, if it is estimated that the own vehicle M will enter the intersection later than the oncoming vehicle O and that the time difference is greater than the crossing-vehicle waiting time Tm3 (i.e., TM−TO>Tm3) (Step S18: NO), it may be estimated that there is the possibility of contact between the own vehicle M and the crossing vehicle I at the intersection, and the procedure may proceed to Step S19.

When the procedure proceeds from any of Steps S13, S15, S16, and S18 to Step S19, the travel controller 1 may receive a command to perform the warning or the intervention of the AEB control, that is, a command to perform the contact avoidance operation. The procedure may then exit the routine.

In response to the command to perform the warning and the intervention of the AEB control from the AEB operation determination unit 6e, the travel controller 1 may first cause the warning device 5 to notify the driver of the own vehicle M of a high possibility of contact between the own vehicle M and the crossing vehicle I at the intersection. Thereafter, the travel controller 1 may calculate an estimated contact time on the basis of the intersection entering time TM of the own vehicle M and the intersection entering time TI of the crossing vehicle I. The travel controller 1 may then calculate a brake assist amount on the basis of the estimated contact time. If determining that it is impossible to avoid the contact by a contact avoidance operation (e.g., braking operation) performed by the driver, the travel controller 1 may assist the contact avoidance operation of the driver by forcibly operating the brake driving unit 4. This effectively helps avoid the contact between the own vehicle M and the crossing vehicle I at the intersection.

Even in a case where it is determined, in Step S11, that there is the possibility of contact between the own vehicle M and the crossing vehicle I at the intersection, the warning or the intervention of the AEB control is not executed if it is determined, in Step S14, that the preceding vehicle P is traveling in front of the own vehicle M at the predetermined inter-vehicular distance Lm or less or if it is estimated, in Step S18, that the oncoming vehicle O traveling on the oncoming lane is entering the intersection. As a result, the contact avoidance operation may be cancelled.

For example, in a case where the preceding vehicle P or the oncoming vehicle O is entering the intersection prior to the own vehicle M, it may be estimated that the driver of the crossing vehicle I will wait for the preceding vehicle P or the oncoming vehicle O to pass through the intersection. In this case, it may be estimated that there is a low possibility of contact between the own vehicle M and the crossing vehicle I at the intersection. In another case where the crossing vehicle I is trying to forcibly enter the intersection and turn to the right or go straight before the preceding vehicle P or the oncoming vehicle O enters the intersection, it may be estimated that the preceding vehicle P or the oncoming vehicle O will perform the contact avoidance operation.

As described above, the travel controller 1 according to the example embodiment compares the intersection entering time TM of the own vehicle M with the intersection entering time TI of the crossing vehicle I to determine the possibility of contact between the own vehicle M and the crossing vehicle I. If there is a high possibility of contact between the own vehicle M and the crossing vehicle I at the intersection, the contact avoidance operation is performed to efficiently avoid the contact between the own vehicle M and the crossing vehicle I at the intersection. Further, even when it is determined that there is a high possibility of contact between the own vehicle M and the oncoming vehicle O at the intersection, the contact avoidance operation is not executed if the surrounding vehicle, such as the preceding vehicle P or the oncoming vehicle O, passes through the intersection prior to the own vehicle M. This helps make the driver feel less troublesome.

In a case where the surrounding environment sensor 2a is an ultrasonic radar, a millimeter-wave radar, or a LiDAR, the surrounding environment sensor 2a may detect a target object by receiving a reflected pulse or reflected light. The reflected pulse or reflected light may be directly received by the surrounding environment sensor 2a. Alternatively, the reflected pulse or reflected light may be secondary reflected light reflected off an obstacle such as a wall before being received. When receiving the secondary reflected light, the surrounding environment sensor 2a can erroneously recognize a non-existent virtual image (ghost) as the target object in the direction passing through the wall surface from which the light is reflected.

For example, if the crossing vehicle I detected by the surrounding environment sensor 2a is a ghost, the contact estimation unit 6c can erroneously determine that there is a possibility of contact between the own vehicle M and the ghost crossing vehicle I at the intersection. However, the example embodiment deals with such a case by determining whether the contact avoidance operation is to be executed on the basis of the estimated timing when the preceding vehicle P traveling in front of the own vehicle M or the oncoming vehicle O enters the intersection.

If it is determined that there is no possibility of contact between the own vehicle M and the crossing vehicle I at the intersection thanks to the presence of the preceding vehicle P or the oncoming vehicle O, the warning or the intervention of the AEB control to the own vehicle M is not performed. This eliminates the need for determining whether the crossing vehicle I is a ghost, and correspondingly reduces the processing load on the crossing-vehicle contact avoidance calculator 6.

It is to be understood that the technology should not be limited to the foregoing example embodiments. For example, the control executed by the crossing-vehicle contact avoidance calculator 6 may be applied to another case where the preceding vehicle is traveling on a first lane adjacent to a side strip of a two or more lane road and where the own vehicle M is traveling on a second lane adjacent to the first lane. In such a case, the preceding vehicle traveling on the first lane may be recognized as the preceding vehicle P traveling in front of the own vehicle M.

According to the foregoing example embodiments, in a case where it is estimated that there is the possibility of contact between the own vehicle and the crossing vehicle at the intersection and where no front vehicle is detected, the contact avoidance operation is executed as usual. This effectively helps avoid the contact between the own vehicle and the crossing vehicle at the intersection. In contrast, in a case where it is estimated that there is the possibility of contact between the own vehicle and the crossing vehicle at the intersection and where a front vehicle is detected, it is determined whether the contact avoidance operation is to be executed on the basis of the estimated timing when the front vehicle enters the intersection and the estimated timing when the own vehicle enters the intersection. This reduces unnecessary contact avoidance operation and helps make the driver of the own vehicle feel less troublesome.

Some example embodiments of the technology are described in detail above with reference to the accompanying drawings. It should be appreciated that the example embodiments of the technology described above are mere examples and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

One or more of the crossing-vehicle recognition unit, the contact estimation unit, the contact avoidance operation determination unit, and the front-vehicle recognition unit in the travel controller 1 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the surrounding environment information acquiring unit, the crossing-vehicle recognition unit, the contact estimation unit, the contact avoidance operation determination unit, and the front-vehicle recognition unit. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or apart of the functions of the crossing-vehicle recognition unit, the contact estimation unit, the contact avoidance operation determination unit, and the front-vehicle recognition unit in the travel controller 1 illustrated in FIG. 1.

The invention claimed is:

1. A vehicle drive assistance apparatus comprising:
a surrounding environment information acquiring unit configured to acquire surrounding information on a surrounding environment in front of an own vehicle traveling on an own-vehicle traveling road;
a position estimation unit configured to determine that (1) there is an intersection where the own-vehicle traveling road crosses a crossing road, (2) vehicles traveling on the crossing road yield right-of way to vehicles traveling on the own-vehicle traveling road, and (3) the intersection has no traffic lights, based on the surrounding information;
a crossing-vehicle recognition unit configured to recognize a crossing vehicle traveling on the crossing road toward the intersection based on the surrounding information;
a contact estimation unit configured to estimate a first timing when the own vehicle enters the intersection and a second timing when the crossing vehicle enters the intersection, and determine whether the own vehicle collides with the crossing vehicle based on the first timing and the second timing;
a contact avoidance operation determination unit configured to determine whether to execute a collision avoidance operation of the own vehicle in response to determining that the own vehicle collides with the crossing vehicle; and
a front-vehicle recognition unit configured to recognize a preceding vehicle (1) that is traveling on the own vehicle traveling road and immediately in front of the own vehicle and (2) that is traveling toward the intersection based on the surrounding information,
wherein even though the contact avoidance operation determination unit determines that the own vehicle collides with the crossing vehicle at the intersection, the contact avoidance operation determination unit is configured (1) not to execute the collision avoidance operation in response to recognizing that preceding vehicle, and (2) to allow the own vehicle to follow the preceding vehicle and pass through the intersection.

2. The vehicle drive assistance apparatus according to claim 1, wherein the contact avoidance operation determination unit is configured to calculate the third timing on a basis of an inter-vehicular distance between the own vehicle and the preceding vehicle.

3. The vehicle drive assistance apparatus according to claim 2, wherein,
in a case where the preceding vehicle is traveling at a vehicle speed lower than a predetermined low-speed determination vehicle speed, the collision avoidance operation determination unit is configured to determine that the contact avoidance operation is to be executed.

4. The vehicle drive assistance apparatus according to claim 1,
wherein, in response to recognizing the preceding vehicle, the contact avoidance operation determination unit is configured to calculate a third timing when the preceding vehicle enters the intersection, and
wherein, in response to determining that the third timing is less than or equal to a predetermined value, the contact avoidance operation determination unit is configured to determine that the collision avoidance operation is not to be executed.

5. The vehicle drive assistance apparatus according to claim 4, wherein
the front-vehicle recognition unit is further configured to recognize an oncoming vehicle approaching the intersection, and
the contact avoidance operation determination unit is configured to calculate a fourth timing on a basis of a difference between the first timing when the own vehicle enters the intersection and a fifth timing when the oncoming vehicle enters the intersection.

6. The vehicle drive assistance apparatus according to claim 5, wherein,
in a case where the first timing when the own vehicle enters the intersection is later than the fifth timing when the oncoming vehicle enters the intersection by a predetermined time or longer, the contact avoidance operation determination unit is configured to determine that the collision avoidance operation is to be executed.

7. A vehicle drive assistance apparatus comprising circuitry configured to:
acquire surrounding information on a surrounding environment in front of an own vehicle traveling on an own-vehicle traveling road;
determine that (1) there is an intersection where the own-vehicle traveling road crosses a crossing road, (2) vehicles traveling on the crossing road yield right-of way to vehicles traveling on the own-vehicle traveling road, and (3) the intersection has no traffic lights, based on the surrounding information;
recognize a crossing vehicle traveling on the crossing road toward the intersection based on the surrounding information;
estimate a first timing when the own vehicle enters the intersection and a second timing when the crossing vehicle enters the intersection, and determine whether the own vehicle collides with the crossing vehicle based on the first timing and the second timing;
determine whether to execute a collision avoidance operation of the own vehicle in response to determining that the own vehicle collides with the crossing vehicle;
recognize a preceding vehicle (1) that is traveling on the own vehicle traveling road and immediately in front of the own vehicle and (2) that is traveling toward the intersection based on the surrounding information;
even though it is determined that the own vehicle collides with the crossing vehicle at the intersection, determine not to execute the collision avoidance operation in response to recognizing that preceding vehicle; and
allow the own vehicle to follow the preceding vehicle to pass through the intersection without the collision avoidance operation.

* * * * *